Dec. 2, 1969   R. W. DOCHTERMAN   3,482,127
MOTOR VIBRATION ISOLATION MOUNTING
Filed Aug. 2, 1968   2 Sheets-Sheet 1
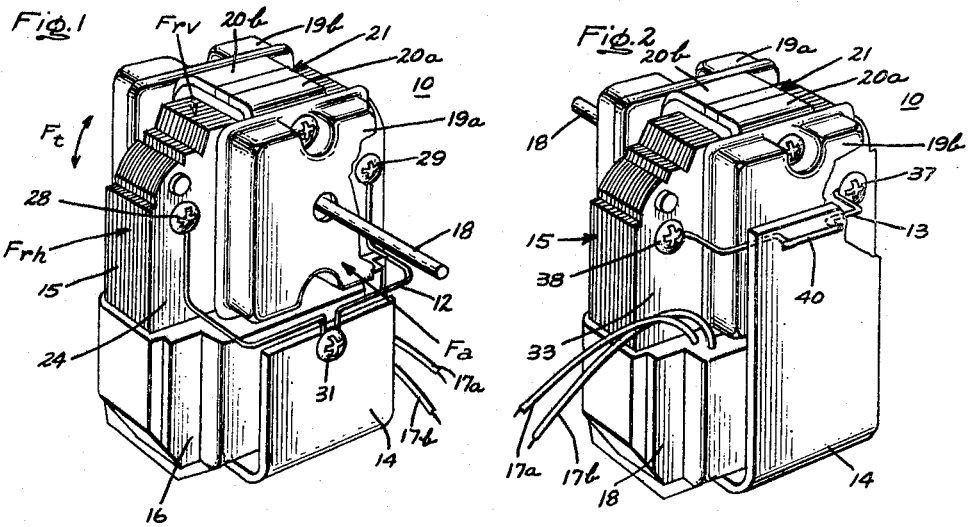
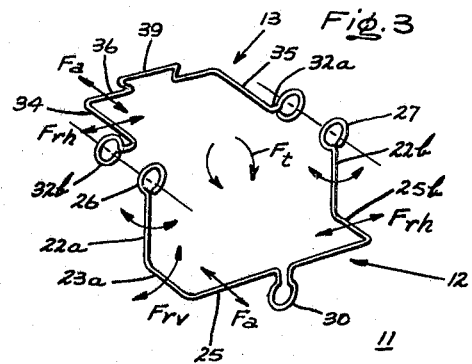
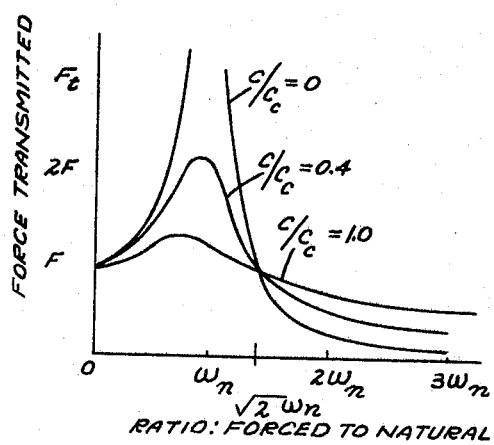
INVENTOR.
Richard W. Dochterman,
BY John M. Stoudt
Attorney.

Dec. 2, 1969  R. W. DOCHTERMAN  3,482,127
MOTOR VIBRATION ISOLATION MOUNTING
Filed Aug. 2, 1968  2 Sheets-Sheet 2
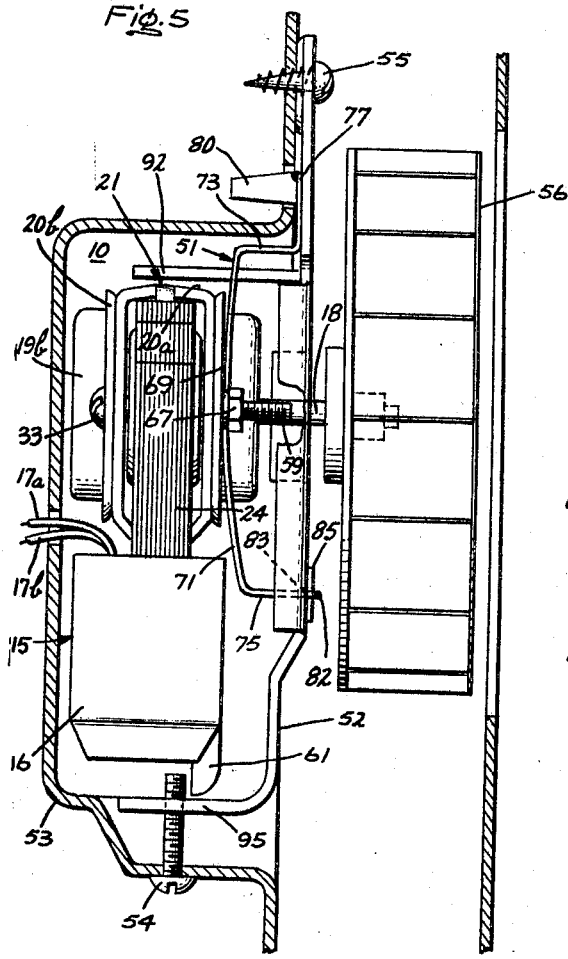
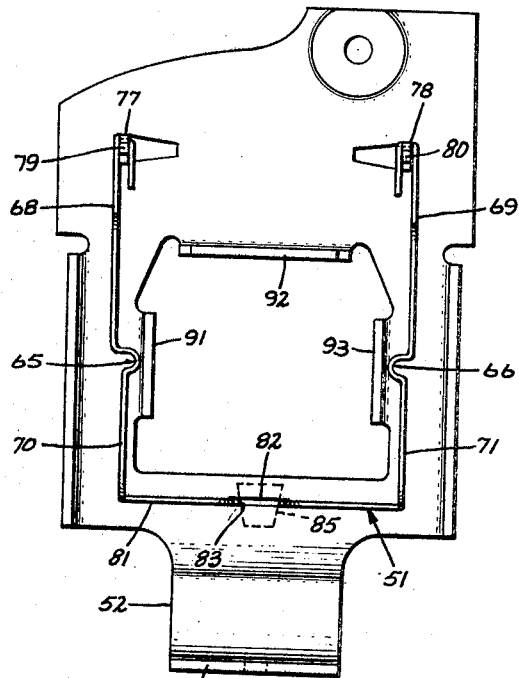
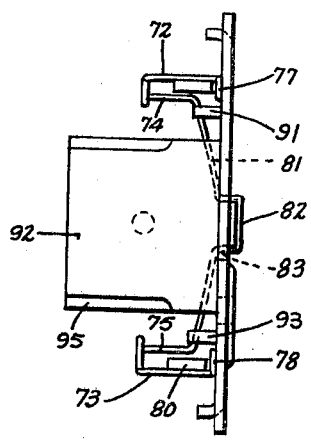
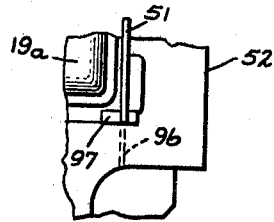
INVENTOR.
Richard W. Dochterman,
BY John M. Stoudt
Attorney.

United States Patent Office 3,482,127
Patented Dec. 2, 1969

3,482,127
MOTOR VIBRATION ISOLATION MOUNTING
Richard W. Dochterman, Fort Wayne, Ind., assignor to General Electric Company, a corporation of New York
Filed Aug. 2, 1968, Ser. No. 749,774
Int. Cl. H02k 5/24
U.S. Cl. 310—51                                11 Claims

ABSTRACT OF THE DISCLOSURE

An electric motor vibration isolation mounting system especially effective in controlling transmission of forces produced by a forcing frequency of 120 Hz. due to rotor excitation, of 50 Hz. due to motor rotation, and of 60 Hz. due to axial rotor vibration. A motor is mounted in spaced relation to a support by means of spring components which serve to statically support the motor and are deflectable in the axial, radial and torsional directions with respect to the axis of rotation of the motor rotor so that all modes of vibration may be isolated from the motor support. The spring members are constructed so that they permit attainment of a resonant frequency of no greater than 14 Hz. during operation. In addition, stops may be provided on the motor so that when the motor is displaced, the stops will abut the motor support and limit displacement of the motor below the elastic limit of the spring mounting components.

BACKGROUND OF THE INVENTION

This invention relates to improved dynamoelectric machine mounting arrangements, and more particularly to such arrangements wherein the vibration-producing forces within the machine are isolated from the support on which the machine is mounted.

In the construction and support of small dynamoelectric machines it is highly desirable to isolate the vibrations produced by the motor from the motor support and the surroundings in which the support is included in order to minimize noise produced by the motor and vibrations transmitted to the motor surroundings.

There are three primary sources of undesirable vibration that appear in a typical 60 Hz. (cycles per second) fractional horsepower motor. The first is a torsional vibration resulting from the pulsation due to line voltage excitation of the motor. In a 60 Hz. motor, frequency of the torque pulsation is 120 Hz. A second source of vibration is radial vibration due to rotation of the rotor, and a third source of vibration is axial vibration due to magnetic vibration of the rotor. A 60 Hz. motor rotating at 3,000 r.p.m. produces a radial vibration having a frequency of 50 Hz.and an axial vibration having a frequency of 120 Hz.

Various motor mountings have been provided to isolate motor vibration from the motor support. One such arrangement for reducing the transmission of motor vibration to motor support comprises the placing of resilient cushion mountings disposed between the motor and support. Generally, these resilient pieces must be molded to conform to motor core dimensions and are expensive to manufacture and install. In addition, their physical characteristics are such that the damping coefficient is of a magnitude which precludes ideal isolation. The greatest reduction of vibratory forces transmitted from a motor to a motor support is achieved by an isolation mounting means having a damping coefficient of zero and having a natural frequency which is lower than the frequency of the forces produced by the ratio of $\sqrt{2}$.

Accordingly, it is an object of the present invention to provide an improved arrangement for effectively isolating all modes of vibration due to the vibration-producing forces within a dynamoelectric machine from the machine support and equipment in which the machine is employed.

It is also an object of the invention to provide an improved vibration isolating mounting arrangement having a low damping coefficient.

It is a further object of the present invention to provide an improved vibration isolating mounting arrangement that can be economically manufactured and is simple and inexpensive to install.

It is a more specific object of the invention to provide an improved yet relatively inexpensive arrangement for isolating motor vibrations, which mounting arrangement has a natural frequency which is lower than the lowest frequency of vibration-producing forces in the motor by the ratio of $\sqrt{2}$ and provides for isolation of torsional, radial and axial forces produced by the motor.

SUMMARY OF THE INVENTION

In carrying out the objects of my invention in one form, I have provided an improved arrangement especially effective in isolating vibration due to torsional, radial and axial forces originating in the dynamoelectric machine, such as pulsating forces originating within the stator and rotor of an AC inductor motor, from the motor supporting member and equipment in which the motor is employed. The motor is mounted to the motor support by means of a spring mounting member which is formed to provide static support to maintain the motor in spaced relation with the motor support and which is deflectable within all degrees of freedom to permit orbiting motion of the motor and provide for isolation of all modes of vibration produced within the motor.

In one form, the motor includes a stationary assembly having first and second faces, such as end faces of a stator, and a rotatable assembly supported for relative rotation by the stationary assembly. The motor is supported such that torsional vibrations having a frequency of 120 Hz., 50 Hz. radial vibrations and 120 Hz. axial vibrations produced during operation are effectively isolated from the support. This is achieved by at least one spring component having first and second leg portions fastened at their ends to the first face of the motor on either side of the axis of rotation of the rotatable assembly. Axial portions project away from each leg portion and are joined by a transverse portion which in turn is secured to the motor support. In one embodiment a second spring component is also used and includes first and second portions which are mounted on the second face on either side of the axis of rotation of the rotatable assembly, and each have axial portions joined thereto extending away from that face of the motor. The axial portions are also joined by a transverse portion which is secured to the portion of the motor support facing the second face of the motor. The spring members may be constructed of a material having a low damping coefficient, such as spring wire.

In the foregoing arrangement, the spring components are deformable or deflectable within all degrees of freedom to provide isolation of all modes of vibration produced within the motor. The motor and spring components form a vibrating unit, and the spring components may be constructed so that the resonant frequency of the vibrating unit is no greater than 14 Hz., which is between ⅓ and ¼ of the smallest applied frequency. Since the spring members have a low damping coefficient, and the resonant frequency of the vibrating mass is less than the lowest frequency of vibrating forces produced by the motor by a ratio greater than the $\sqrt{2}$, effective vibration isolation is provided. Moreover, the arrangement does not require close tolerances, is easily assembled together, readily installable, and is quite economical to fabricate.

The subject matter which I regard as my invention is particularly pointed out and distinctly claimed in the concluding portion of the specification. My invention, itself, both as to its organization and method of operation, together with further objects and advantages thereof, may be better understood by reference to the following description taken in connection with the following drawings.

BRIEF DESCRIPTION OF THE DRAWINGS

In the drawings:

FIGURE 1 is a view in perspective, partially broken away to show details of one type of small dynamoelectric machine, by way of exemplification, and its support incorporating one form of the present invention;

FIGURE 2 is a view in perspective, partially broken away of the dynamoelectric machine and its support shown in FIGURE 1 illustrating further details of the one form of the machine mounting arrangement;

FIGURE 3 is a view in perspective of spring components in the form of the invention illustrated in FIGURES 1 and 2;

FIGURE 4 shows a plot of percent transmissibility against the ratio of forcing frequency W to natural frequency $W_n$ for various values of damping constant ratio $C/C_c$ (actual damping), $C$/critical damping, and $C_c$ in a single degree of freedom systems;

FIGURE 5 is a side view of the dynamoelectric machine of the exemplification, illustrating another form of the improved mounting arrangement in connection with a blower application;

FIGURE 6 is a view of the dynamoelectric machine side of the mounting support place as seen in FIGURE 5, with the spring component of the mounting arrangement attached to the plate;

FIGURE 7 is an enlarged side partial view of one manner in which the free end of the spring component may be attached to the mounting support plate of FIGURE 6;

FIGURE 8 is a plan view of the plate and spring assembly of FIGURE 6;

FIGURE 9 is a side partial view primarily revealing another way in which the free end of the spring component may be secured to the mounting support plate of FIGURE 6; and FIGURE 10 is a partial plan view of the free end of the spring component and plate seen in FIGURE 9.

DESCRIPTION OF THE PREFERRED EMBODIMENTS

Referring now to the drawings in more detail, one preferred embodiment of my invention is disclosed in FIGURES 1-4 in connection with a fractional horsepower, alternating current, shaded pole induction electric motor 10. The motor 10 is mounted by means of spring member 11 comprising spring components 12 and 13, shown in FIGURE 3 in spaced relation with a support 14 in a manner which will be described in more detail hereinafter.

For the purpose of disclosing the present invention the motor of the exemplification is of the type more fully disclosed in the H. C. Kaeding Patents 3,196,297 and 3,270,227, and the J. E. Baclawski Patent 3,238,401, all assigned to the same assignee as the present invention. Briefly, the motor 10 includes a stator 15 of a stationary assembly formed with a laminated core and an electrical coil or winding, enclosed within an imperforate covering of insulating material 16 and mounted between depending legs of a stator yoke section. The winding is adapted for connection to a suitable source of alternating current power through leads $17_a$, $17_b$, such as a 115 volt, 60 Hz. source (not shown). A rotatable assembly 18, having a single output shaft portion, is mounted for relative rotation with respect to stator 15 by a pair of end frames or bearing assemblies $19_a$, $19_b$ (part of the stationary assembly) attached to the stator by generally U-shaped metal brackets $20_a$, $20_b$ which have opposed legs cemented to the periphery of the stator, as indicated at 21 in FIGURES 1 and 2.

The preferred arrangement will now be considered in which the motor 10 of the exemplification is supported to isolate or reduce the transmission of vibration and noise generating forces, especially those resulting from torsional vibrations and rotating mass unbalance, from the motor during operation in the equipment in which the motor is employed. There are three forces causing various modes of vibration. The torsional force, indicated as $F_t$ in FIGURE 1, is due to alternating frequency pulsations of the stator winding. The radial force, which may be resolved into vertical and horizontal components, indicated $F_{rv}$ and $F_{rh}$, respectively, are due to unbalance in the rotating rotor and load. Also, there is an axial mode of vibration caused by axial force $F_a$ due to magnetic vibration of the rotor.

The spring components 12 and 13, by means of which the motor 10 is mounted in spaced relation to the support 14, are constructed to isolate each mode of vibration. As seen in FIGURE 3, the spring component 12 is somewhat U-shaped in appearance, comprising first and second leg portions $22_a$ and $22_b$ and axial portions $23_a$ and $23_b$ which extend away from core end or side face 24 of stator 15 in an axial direction and are joined by a transverse or bight section 25.

Legs $22_a$ and $22_b$ are respectively secured to the stationary assembly by hook portions 26 and 27 which are retained against side face 24 by fasteners 28 and 29. The transverse section 25 is secured to the support section 14 by means of a hook portion 30 which is secured to the support 14 by means of fastener 31.

Spring component 13 is similarly constructed to isolate vibration in each direction by means of leg portion $32_a$ and $32_b$, axially extending portions 34 and 35 which extend away from the other side face 33, and transverse section 36. The leg portions $32_a$ and $32_b$ are secured to the stationary assembly (e.g., the side core face 33 of stator 15) by fasteners 37 and 38, respectively, while a hook portion 39 is formed in the transverse portion 36 of the spring member 13 which is received in a recess 40 in the rear portion of the support 14. While securing the hook portion 39 in the recess 40 of the support 14 is a most convenient means for securing the spring component 13 to the support 14, a hook portion could be formed in the spring component 13 which could be secured to the support 14 by means of a screw fastener also.

In the embodiment in FIGURE 1, the spring member 11 supports the motor 10 in spaced relation with the support 14 so that if large, direct force is applied to the motor 10, the motor 10 is constrained from moving through a displacement which would be sufficient to exceed the elastic limits of the spring components 12 and 13. Where it is desired to provide greater spacing between the motor 10 and the support 14, stops in the form of lugs projecting from the support 14, for example, could be provided to limit motor displacement so that the elastic limit of the spring components 12 and 13 is not exceeded.

The spring member 11 comprising spring components 12 and 13 in the exemplification serves two purposes. First, it serves to statically support the motor 10 on the support 14, and in addition, it permits movement of the motor within all degrees of freedom. As seen in FIGURE 3, the spring components 12 and 13 are deformable in response to modes of vibration produced by each of the vibration-producing forces within the motor 10 in order to provide for complete vibration isolation. For the purpose of description of the spring member 11, it may, for example, be stated that axial portions $23_a$ and $23_b$ of the spring component 12 are deflectable or deformable in response to the horizontal and vertical components of the radial forces produced in the motor 10, as are portions 34 and 35 of the spring component 13. It is seen that all of the portions of both the spring components 12 and 13 have a composite reaction to the vibration-producing forces and each deform to some degree in response to each force produced within the motor 10.

In the above-described system, the motor 10 and spring member 11 form a vibrating unit having a natural frequency $W_n$. The natural frequency $W_n$ of the vibrating unit is determined by the expression $\sqrt{K/m}$, where K is the composite spring constant of the members 12 and 13, and m is the mass of the motor and spring member 11. As will be explained with reference to FIGURE 4, in order to provide for optimum vibration isolation, the ratio of the lowest forcing frequency, or vibration-producing force within the motor, to the natural frequency of the vibrating unit should be greater than $\sqrt{2}$.

The composite spring constant K of the spring components 12 and 13 is determined by the flexibility of the spring components 11 and 12, which may be expressed in terms of their damping coefficient, their diameter, and dimensions. The spring components 12 and 13 may be designed to have a suitable composite spring constant K to provide a satisfactory natural frequency $W_n$ by the use of equations relating to the analysis of a statically indeterminate beam.

Generally, the most suitable materials for the spring-components 12 and 13 are well-known spring materials such as music wire, high carbon spring wire, phosphor, bronze or other commonly manufactured spring materials. Plastic spring materials may also be used. However, in order to achieve suitable operation, plastic components must generally be of a greater diameter than a corresponding wire spring component, and this leads to less ease in assembly of the system, although the use of plastic materials may still be practical.

It is also important to note that by use of equations of a statically indeterminate beam, many forms of spring components for mounting the motor 10 on a support 14 could be designed providing the desired vibration characteristics. It is not necessary that mounting components have the particular configuration of the exemplification disclosed in FIGURES 1–3, and one or any other number of spring components could be used to comprise a spring member 11. The only necessary characteristic of the spring mounting component is that it be capable of statically supporting the motor and deformable within all degrees of freedom of movement of the motor. Thus, for example, substantially U-shaped spring mounting components or spring mounting components of any other configuration could be used if they were designed to support the motor and have a desired natural frequency $W_n$. The spring mounting members need not be mounted to either core face of the motor 10, but could also be mounted to other portions of the core.

As will be understood from the above description, the components of the above system which vibrate due to the various forces acting within the system are the motor 10 and the spring components 12 and 13. In carrying out the invention practice, the ratio of natural frequency of the vibrating unit comprising the motor 10 and the spring member 11 to the frequency of each force which vibrates the motor 10 should be less than the $\sqrt{2}$. This is best understood by reference to FIGURE 4.

As seen in FIGURE 4, the abscissa represents the ratio of a forcing frequency $W_f$ to the natural frequency $W_n$ of the motor 10 and spring member 11 in a single degree of freedom system. The ordinate represents the force transmitted by the spring member 11 to the motor surroundings as a function of the amplitude of the vibrating force in one direction, F. This relationship is plotted for various values of the damping ratio $C/C_c$, where C is the damping factor of the spring members 12 and 13 and $C_c$ is the critical damping factor. It is seen that for each valve of $C/C_c$ the smallest percentage of the vibrating force is transmitted by the spring components 12 and 13 when the ratio of the force frequency to the natural frequency is greater than $\sqrt{2}$.

The motor 10 used in the exemplification of the invention was a two pole motor operating at 3,000 revolutions per minute and was energized from a 60 Hz. power supply. The frequency $W_{Ft}$ of the torsional force was 120 Hz. The frequency $W_{Frv}$ and $W_{Frh}$ of the vertical and horizontal components of the radial forces $F_{rv}$ and $F_{rh}$ was 50 Hz., and the frequency $W_{Fa}$ of the axial force $F_a$ was 120 Hz. The natural frequency $W_n$ of the unit comprising the motor 10 and spring components 11 and 12 equal to $\overline{K}/m$, was 14 Hz. It is seen that the ratio of the lowest forcing frequency, $W_{Fr}$ to the ratio of the natural frequency of the vibrating unit was 50/14 which is equal to approximately 3.57. This value is more than twice the square root of two and hence highly satisfactory. In order to obtain a system having a natural frequency of approximately 14 Hz., a motor having a weight of 0.875 lb. and a spring member having a spring constant of 9.3 lbs. inches were used. If it were desired to use a motor having a different weight, the dimensions of the various sections of the spring components 12 and 13 could be changed, or the diameter of each wire could be varied.

The vibration isolation system I have shown has several advantages. First, the system can be easily designed to suppress all modes of vibration produced within the motor, radial, torsional and axial. Secondly, because the mounting members and the spring components 11 and 12 are resilient, the tolerances to which they may be made for mounting the motor 10 within the support 14 are broad. In addition, not only are the springs simple in shape and easy to manufacture, but since they are all metal, they are not affected by normal environmental conditions of temperature, sunlight, ozone, oil and other factors and there is not change in their physical properties due to aging as may occur in the case of rubber mounts.

In the illustrated embodiment of FIGURES 5–8 inclusive, I have shown another form of the present invention. For ease in presentation, a motor of the type used in connection with the first embodiment of FIGURES 1–4 inclusive is employed and similar motor components are identified by the same references. In this exemplification, motor 10 is mounted by means of a single somewhat U-shaped spring component 51 disposed adjacent only one side of stator 15, the component having portions attached to mounting plate 52. The motor 10 is substantially enclosed between the support 52 and a closure member 53, which is secured to the support member 52 at its lower end by means of the bolt 54 and at its upper end by means of a fastener 55. The arrangement shown in FIGURE 5 is particularly suited for an application in which the motor 10 is coupled to drive a blower 56.

Torsional, radial and axial vibratory forces are produced within the motor 10 in response to the alternating current energizing the motor 10 and in response to unbalance in the rotatable assembly 18 and driven blower 56. The force of radial vibrations produced within the motor 10 is greater than that produced by the exemplification of FIGURES 1 and 2 since unbalance in the blower 56 as well as unbalance in the rotatable assembly 18 contribute to the radial force.

The spring component 51 is provided to statically support the motor 50 on the mounting plate 52 and permit motion of the motor within all degrees of freedom in order to isolate all modes of vibration produced within the motor 10. As seen in FIGURE 6, the spring component 51 includes portions 65 and 66 at which the spring component 51 may be fastened to the front core face of the motor 50. To provide for static support, the portions 65 and 66 are disposed on opposite sides of the rotatable assembly shaft. A fastener 67 is provided to secure the motor portion 65 to the one side face 24 of stator 15 and a similar fastener is provided to secure similarly the portion 66. First and second leg portions 68 and 69 project upwardly from portions 65 and 66, respectively, while leg portions 70 and 71 project downwardly or depend from the portions 65 and 66, respectively, lying next to the associated side face of stator 15.

In order to further provide for static support of the motor 10, the leg portions 68–71 have axial portions 72–75, respectively, projecting therefrom in the direction axially away from the associated face of the stator 15 (FIGURES 5 and 8). To secure the spring component 51 to the mounting plate 52, hook portions 77 and 78 are provided extending upwardly, respectively, from axial portions 72 and 73, respectively. The hook portions 77 and 78 are removably secured to tabs 79 and 80 which respectively project in the direction toward face 24 of the motor 10 from the support plate 52. If desired cement 80a or other means may be employed as shown in FIGURE 7 to make the securement more permanent. At the lower portion of the spring component 51, the axial portions 74 and 75 are joined by transverse portion 81 having hook portion 82 formed therein in order to provide for securing the lower portion of the spring component 51 to the mounting plate 52. The hook portion 82 is secured in a recess 83 formed in the mounting plate 52 and may be retained in place by a pin 85.

While the transverse portion 81 of lower portion of the spring component 51 is shown as being somewhat bowed in order to provide for freedom of motion in the axial direction, it is not necessary to form portion 81 in this particular configuration. The portion 81 could be straighter or more rounded, and axial motion would still be permitted by other portions of the spring component 51. The arrangement as shown in FIGURE 8, however, provides for the best static support of the motor 10 and freedom of motion caused by the vibrating forces produced in the motor 10.

A spring component 51 having the desirable characteristics could also be formed in which upper and lower leg portions are secured to a motor and have axial portions extending therefrom which are secured to a supporting plate. Similarly, a suitable spring component could be manufactured in which the upper and lower ends of the spring component are joined by transverse portions. In addition, any suitable configuration could be used that provides sufficient static support for the motor 10 and provides freedom of motion for the motor in response to vibration-producing forces.

Once again, the spring constant K of the spring component 51 is a composite constant determined by the dimensions of the various portions of the spring component 51, the flexibility of the material used to form the spring component 51, and its diameter. Equations relating to the analysis of a statically indeterminate beam may be used in order that the spring component 51 is designed so that the ratio of the lowest forcing frequency of vibration-producing force produced within the motor 10 to the natural frequency of the vibrating unit comprising the motor 10 and spring component 51 is greater than $\sqrt{2}$. The spring 51 thus provides optimum vibration isolation for all modes of vibration produced within the motor 10.

Spring 51 and the manner of its assembly to plate 52 may readily be modified while still retaining the benefits mentioned above. For instance, the transverse portion 81 of spring 51 could be attached to plate 52 above motor 10 (as viewed in FIGURE 5) and the free ends of the spring removably secured to the plate in the manner revealed in FIGURES 9 and 10. The free ends 96 of the spring are assembled behind L-shaped tabs 97 cut and bent from the face of plate 52 such that the spring may readily be disassembled and reassembled whenever desired.

Thus it will be seen from the foregoing that our improved motor vibration isolation mounting arrangement which has a low damping coefficient and is effective in providing proper control of transmission of certain forces produced by the motor during operation to its support. In spite of this, arrangement is unusually low in cost being formed of inexpensive parts which can be economically manufactured, easily and rapidly assembled together, simple and inexpensive to install as a unit, and not restricated to any one application, among other advantageous features.

From an inspection of the motor mounting arrangement illustrated in FIGURES 5, 6 and 8 in particular, it will be appreciated that the motor 10 is protected from damage should it become subjected to sudden impact loads having radial and axial force components of relatively large magnitudes; e.g., forces sufficiently large to produce pressures on spring 51 beyond its elastic limit. As best seen in FIGURE 5, radial movement of motor 10 relative to its support is limited in the upper direction (as viewed in that figure) by axial extension 92 integrally formed from plate 52 and axial extension 95 disposed below the motor 10 which has a depending projection 61 adapted to strike extension 95. Under normal load and operating conditions, the distances between extensions 92, 95 and the respective adjacent motor peripheries are large enough to permit unimpeded relative movement or motor 10 relative to its support. However, should an impact load be applied to the motor, the distances are sufficiently small (e.g., thirty mils) to permit the adjacent motor peripheries to strike either of the extensions 92, 95 to limit travel of the motor. Screws 54 and 59 are so disposed respectively to motor projection 61 and the adjacent part of the vertical wall of plate 52 that the axial components of impact loads and movement of motor 10 are also effectively controlled in the same manner discussed above in connection with the radial components.

Consequently, it should be apparent to those skilled in the art that while I have shown and described what at present is considered to be the preferred embodiments of my invention in accordance with the patent statute, it is to be understood that modifications can be made without actually departing from the true spirit and scope of this invention.

What I claim as new and desire to be secured by Letters Patent in the United States is:

1. In a system for mounting an electric motor in which torsional, radial and axial vibrations with respect to an axis of rotation of the motor are produced, the combination comprising:
    (a) an electric motor comprising a stationary assembly having first and second faces and a rotatable assembly having an axis of rotation and being supported for relative rotation with respect to the stationary assembly;
    (b) a support for said motor spaced from the first and second faces of said stationary assembly;
    (c) a first spring component having leg portions secured to the stationary assembly in the vicinity of said first face, each leg portion having an axial portion extending away from said first face and a transverse portion being secured to said support; and
    (d) a second spring component having axial portions extending away from said second face of said stationary assembly and secured thereto at one end and a transverse portion being secured to the support, said first and second spring components being deformable to permit controlled torsional, radial and axial movements of said motor with respect to the axis of rotation of the rotatable assembly.

2. An arrangement as defined in claim 1 in which said first and second faces are formed by a stator, said first spring component comprises first and second leg portions each secured to said first face of said stator on opposite sides of the rotatable assembly, and said first spring component further comprises a transverse portion joining the axial portions extending from said first and second leg portions, said transverse portion being secured to said support, and in which said second spring component comprises first and second axial portions secured to the second face of said stator on opposite sides of the axis of rotation of the rotatable assembly, said first and second axial portions of said second spring component being joined by the transverse portion, which is secured to the motor support.

3. The system of claim 1 in which said first and second spring components are made of spring wire.

4. A system as defined in claim 3 in which said first and second spring components are dimensioned so that the natural frequency of the vibrating mass comprising said motor and said first and second spring components is less than the lowest frequency of vibration produced within the motor by the ratio of $\sqrt{2}$.

5. The system motor of claim 3 in which said support is spaced from said motor so that said motor cannot be displaced to exceed the elastic limits of said spring component before abutting said support.

6. In a vibration-isolating arrangement for mounting a motor in which torsional, radial, and axial vibrations are produced with respect to an axis of rotation of the motor to a support, the combination comprising:
  (a) a motor having a stationary assembly including first and second core faces and a rotatable assembly supported for relative rotation by said stationary assembly; and
  (b) at least one spring mounting member secured to said stationary assembly having portions extending away from said motor adapted to be secured to a support, said spring mounting member having means deformable in the torsional, radial and axial directions with respect to the axis of rotation of the rotatable assembly of said motor.

7. An arrangement as defined in claim 6 in which said at least one spring mounting member comprising:
  (c) a first spring mounting component having first and second leg portions secured at one end to said first core face of said motor on opposite sides of said rotatable assembly, portions respectively extending from the other end of said first and second leg portions extending away from the front core face of said rotor, and a transverse portion joining said first and second axial portions and being secured to a support; and
  (d) a second spring component having first and second axial portions secured to said second core face of said motor on opposite sides of the axis of rotation of the rotatable assembly and extending away from said second core face of said motor, and a transverse portion secured to said support and joining together said first and second axial portions.

8. A system as defined in claim 6 in which said spring member comprises a spring portion having first and second portions secured to the first face of said motor on opposite sides of said rotatable assembly, first and second leg portions extending upwardly along said first face and being generally deformable to the contour thereof and first and second axial portions extending away from said first and second leg portions, respectively, said first and second axial portions having portions formed at the ends thereof adapted to be secured to a support, and third and fourth leg portions extending downwardly along said first face of said motor from said first and second portions, respectively, being generally deformable to the contour thereof, third and fourth axial portions extending from said third and fourth leg portions, respectively, away from said first face of said motor, and a transverse portion secured to said support joining said third and fourth axial portions.

9. An arrangement as defined in claim 6 further comprising a stop portion fastened to the stationary assembly of said motor for engaging a support to prevent said motor from being displaced in an amount sufficient to exceed the elastic limit of said at least one spring member.

10. In an electric motor vibration isolation mounting arrangement:
  (a) an electric motor having a stationary assembly supporting a rotatable assembly for revolution about an axis of rotation; and
  (b) a first spring member having selected portions attached to said stationary assembly on one side thereof in spaced relation to the axis of rotation, said first spring member having axial portions extending away from the one side of the stationary assembly and transverse portions adjacent said axial portions remote from said one side adapted to be secured to a support, said at least one spring member being deflectable in axial, torsional, and radial directions for controlling the transmission of predetermined vibrations produced by the motor during operation from the support.

11. The arrangement of claim 10 in which as least a second spring member has selected portions attached to the stationary assembly on another side thereof remote from said one side, said second spring member having axial portions joined together by a transverse portion adapted to be secured to the support, said first and second spring members acting together in controlling the transmission of vibrations produced by the motor during operation from the support.

References Cited

UNITED STATES PATENTS

| 2,269,245 | 1/1942 | Blessing | 248—18 |
| 2,896,886 | 7/1959 | Slattery et al. | 248—15 |
| 2,936,140 | 5/1960 | Copeland | 248—26 |
| 2,957,665 | 10/1960 | Feiertag et al. | 248—19 |
| 3,206,148 | 9/1965 | Longsworth | 248—18 |
| 3,317,166 | 5/1967 | Janssen | 248—26 |
| 3,317,124 | 5/1967 | Morrill | 230—273 |

WARREN E. RAY, Primary Examiner

U.S. Cl. X.R.

248—15, 18, 26; 310—91